United States Patent Office 2,935,392
Patented May 3, 1960

2,935,392
METHOD AND COMPOSITION FOR THE CONTROL OF GRASS WEED

Dorsey R. Mussell, Clare, Mich., assignor to The Dow Chemical Company, Midland, Mich., a corporation of Delaware No Drawing. Application March 5, 1956
Serial No. 569,267

9 Claims. (Cl. 71—2.3)

This invention is concerned with the control of weeds and is particularly directed to a method and composition for the control of germinant seed and emerging seedlings of gramineous weeds.

According to the present invention, it has been discovered that the growth of grasses can be controlled by contacting germinant seed and emerging seedlings thereof with a herbicidal amount of a dialkyl mono-nitrophenol of the formula

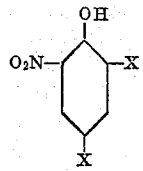

wherein X is selected from the group consisting of tertiary butyl and tertiary amyl radicals. It is among the advantages of the invention that the above dialkyl mono-nitrophenols operate with a high degree of selectivity so that grass weeds species are controlled without injury to the seeds of many desirable broad leaf crops planted in the area treated in accordance with the invention. It is a further advantage that the compounds of the invention show a marked persistency of herbicidal action in the soil. Yet another advantage is that the dialkyl mono-nitrophenols of the invention appear to exert an anti-microbial action so that desirable broad leaf crop plants emerging from soil treated in accordance with the invention are protected from soil-borne diseases, such as the attack of "damping off" organisms.

In carrying out the invention, the dialkyl mono-nitrophenol may be dispersed in a herbicide carrier to assist in the distribution of the herbicidal phenol compound. Thus, the dialkyl mono-nitrophenol may be dispersed in a finely divided inert carrier such as pyrophyllite, diatomaceous earth, kaolin or the like to produce dust compositions. Suitable surface active dispersing agents can be included in such dust compositions to produce wettable powders. Alternatively, the active dialkyl mono-nitrophenols are dissolved in organic solvents to prepare solvent spray compositions or concentrates and the latter may be further formulated with a surface active dispersing agent to produce concentrates adapted to be dispersed in water to prepare aqueous emulsion spray compositions.

In the preparation of dusts, the dialkyl mono-nitrophenol is mechanically mixed with the finely divided inert carrier and ground in a hammermill or the like. Alternatively, the active nitrophenol compound may be dissolved in a volatile organic solvent and mixed with the finely divided inert solid to prepare a solvent mix composition from which the solvent can thereafter be recovered in conventional fashion. Where such dust compositions are to be directly applied for the control of weeds, it is generally desirable to employ from about 1 to 10 percent by weight of the active nitrophenol compound in the composition. Where the dust composition is designed as a concentrate for subsequent dilution, higher proportions of up to about 40 percent by weight of the active nitrophenol compound may be employed. Where the dust composition is designed as a wettable powder concentrate, from about 10 percent to about 40 percent by weight of the active nitrophenol compound and from about 0.5 percent to about 5 percent by weight of a suitable surface active dispersing agent are incorporated in the composition.

In the preparation of spray compositions, the proportion of dialkyl mono-nitrophenol will vary depending upon whether the composition is designed as a concentrate for dilution before application and on the actual mode of application employed. Thus, in aqueous dispersions applied in irrigation water as a soil drench, good results are obtained with as little as 0.06 pound of the mono-nitrophenol compound per hundred gallons of aqueous dispersion. Where the composition is to be applied as an aqueous spray, it is generally desirable to employ an emulsion composition containing from about 1 to about 20 pounds of the active nitrophenol compound per hundred gallons of spray, and higher proportions of the nitrophenol compound may be employed in organic solvent spray systems. Liquid concentrate compositions are conveniently prepared with an organic solvent containing from about 10 to 40 percent by weight of the dialkyl mono-nitrophenol toxicant and emulsifiable concentrate compositions can be prepared by incorporating a surface active dispersing agent in such solvent concentrates.

Surface active dispersing agents adapted to be employed in the emulsifiable concentrates include condensation products of alkylene oxides with phenols and organic acids, polyoxyalkylene derivatives of hexitan esters, complex ether alcohols and mahogany soaps. In wettable powder concentrates, the above surface active dispersing agents are suitable and also long chain alkyl sulfates and sulfonates, alkyl aryl sulfonates and lignin sulfonates.

Suitable organic solvents include liquid aromatic hydrocarbons, lower alkyl ketones and chlorinated hydrocarbon solvents. An emulsifiable concentrate comprising a dialkyl mono-nitrophenol and a non-ionic surface active dispersing agent in solution in an aromatic hydrocarbon solvent constitutes a preferred embodiment of the invention.

The dialkyl mono-nitrophenol may be applied in any suitable fashion provided that the active material is distributed so as to contact the germinant seed and emerging seedlings of the vegetation to be controlled with an amount of the active nitrophenol compound sufficient to suppress the growth thereof. When applying dust compositions, it is desirable to employ raking means or a disc and drag combination to distribute the active herbicidal agent on and into the upper layers of the soil. In one method of liquid application, the dialkyl mono-nitrophenol is dispersed as a dilute emulsion in irrigation water and applied as a soil drench. Alternatively, conventional herbicidal spray machinery may be employed to distribute the nitrophenol material in the form of a solvent solution or aqueous spray emulsion. In any case, good results have been obtained when applying from about 10 to about 50 pounds of the dialkyl mono-nitrophenol per acre.

The dialkyl mono-nitrophenols are prepared by reacting a 2,4-ditertiaryalkylphenol of the formula

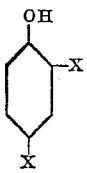

wherein X represents a tertiarybutyl or tertiaryamyl radical, with a molar excess of fuming nitric acid at a temperature below 0° C. in the presence of a reaction solvent. In one mode of carrying out the reaction, the 2,4-ditertiaryalkylphenol is dissolved in an excess of a mixture of acetic acid and acetic anhydride and the resulting mixture cooled and added portionwise with stirring to a solution of a molar excess of 90 percent fuming nitric acid in glacial acetic acid. The reaction mixture is maintained at temperatures below 0° C. and preferably at from about −10° to −15° C. with stirring for a period of time to complete the reaction. The reaction proceeds readily when the di-tertiaryalkylphenol and nitric acid are contacted under the above conditions and the rate of reaction may be controlled by the rate of admixture of the reactant solutions. As soon as the admixture of the reactants is completed, the reaction mixture is poured into an excess of crushed ice and from the resulting mixture the nitrophenol product is extracted with a liquid hydrocarbon such as hexane. Thereafter, the extract is separated, washed with water and dilute aqueous sodium bicarbonate solution and the contained 2,4-ditertiaryalkyl-6-nitrophenol separated by precipitation as the sodium salt, conversion of the latter to the free phenol and crystallization.

The following examples illustrate the invention, but are not to be construed as limiting the same.

*Example 1*

2,4-ditertiarybutyl-6-nitrophenol (M.P. 62.5°–63° C.) and a non-ionic surface active dispersing agent were dissolved in xylene to prepare the following emulsifiable composition.

| Ingredient: | Parts by weight |
| --- | --- |
| 2,4-ditertiarybutyl-6-nitrophenol | 25 |
| Triton X–155 | 10 |
| Xylene | 65 |

Triton X–155 is a commercial surface active dispersing agent identified as an alkylphenol-ethylene oxide condensation product. The above composition was dispersed in water to produce a dilute aqueous emulsion containing 0.42 pound of 2,4-ditertiarybutyl-6-nitrophenol per hundred gallons of emulsion. The dilute emulsion was applied as a soil drench at the rate of about 0.43 acre-inch of dilute emulsion per acre to an area of soil previously planted to radishes and heavily infested with seed of Japanese millet and wild oats, representative of undesirable grass weed species. The above application resulted in the distribution of the 2,4-ditertiarybutyl-6-nitrophenol at the rate of 50 pounds per acre of surface. A similarly planted and infested adjacent area of soil was maintained untreated to serve as a check. About two weeks after the above application, radish, millet and wild oats had emerged in the untreated check area and made vigorous growth. Radishes had emerged and made growth in the treated area in numbers and vigor substantially the same as in the untreated check area. In contrast, there were no millet or wild oat plants in the area treated with the dialkyl nitrophenol compound.

Following the above operation, all plants were removed from the treated and untreated areas and fresh seed of radish, millet and wild oats were planted. Thereafter, the areas were maintained under good growing conditions for about three weeks. At this time radish, millet and wild oats had again emerged in profusion in the untreated check area and were growing vigorously. In the treated area, radishes showed emergence and growth equal to those of the checks; however, no living millet or wild oats plants were found in the treated area.

*Example 2*

The emulsifiable composition of Example 1 was dispersed in water to prepare a dilute emulsion containing 0.12 pound of 2,4-ditertiarybutyl-6-nitrophenol per hundred gallons of the diluted composition and the latter applied as a soil drench at the rate of about 0.38 acre-inch of the dilute emulsion per acre to an area of soil planted to radishes and infested with Japanese millet and wild oat seed as in Example 1. The above application resulted in the distribution of the 2,4-ditertiarybutyl-6-nitrophenol at the rate of 12.5 pounds per acre. Observation about two weeks after the treatment date showed a 100 percent control of the growth of the millet and wild oats while radishes showed emergence and growth equal to that of plants growing in the untreated check area.

*Example 3*

The following ingredients were mechanically mixed together and ground in a high speed hammermill having a 1/16 inch slotted screen.

| Ingredient: | Parts by weight |
| --- | --- |
| 2,4-ditertiaryamyl-6-nitrophenol, crystalline | 40 |
| Diatomaceous earth | 57.5 |
| Alkyl aryl sulfonate (Nekal A) | 2 |
| Ligno-sulfonate product | 0.5 |

The above composition is adapted to be dispersed in water to prepare spray compositions suitable for the control of grass seed in soil.

*Example 4*

The emulsifiable composition of Example 1 was dispersed in water to prepare an emulsion spray containing 14.5 pounds of the ditertiarybutyl-nitrophenol per hundred gallons of spray composition and the latter was applied with a pressure sprayer at the rate of 138 gallons per acre to an area of soil previously fitted and planted with barn-yard grass, old witch grass, cotton, beans, radishes and corn. This application resulted in the distribution of the dialkyl mono-nitrophenol compound at the rate of 20 pounds per acre. Thereafter, the treated area and a similarly planted untreated area were maintained under good growing conditions for a period of about three weeks. At the end of the three-week interval, seed of all the test species had germinated and the plants were making vigorous growth in the untreated area. In the treated area cotton, beans, radishes and corn had emerged and made vigorous growth essentially equal to that for the corresponding plants in the untreated area. In contrast, in the treated area there were no living plants of barn-yard grass or old witch grass. It was further observed that a number of the emerging seedlings of crop plants in the untreated area were affected with "damping-off" organisms whereas the cotton, beans, radishes and corn in the treated area were substantially free of such disease.

I claim:

1. A method for the control of gramineous weeds which comprises contacting germinant seed and emerging seedlings of grasses with a compound of the formula

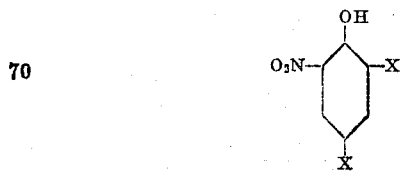

wherein X is selected from the group consisting of tertiarybutyl and tertiaryamyl radicals, in amount sufficient to suppress the growth of the grasses.

2. A method for the control of gramineous weeds, which comprises distributing a dialkyl mono-nitrophenol compound of the formula

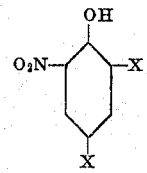

wherein X is selected from the group consisting of tertiarybutyl and tertiaryamyl radicals, in the soil in close proximity to the germinant seed and emerging seedlings of grasses, said compound being employed in the amount of from about 10 to about 50 pounds per acre.

3. A method according to claim 2 wherein the dialkyl nitrophenol is 2,4-ditertiarybutyl-6-nitrophenol.

4. A method according to claim 2 wherein the dialkyl nitrophenol is 2,4-ditertiaryamyl-6-nitrophenol.

5. A method for the selective control of gramineous weeds in plantings of broad-leaf crop plants which comprises applying a dialkyl mono-nitrophenol of the formula

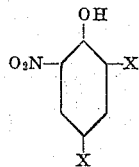

wherein X is selected from the group consisting of tertiarybutyl and tertiaryamyl radicals, to soil in close proximity to the germinant seed and emerging seedlings of the gramineous weeds, said soil having been previously planted to the desired broad-leaf crop plant and the application being made in amount sufficient to suppress the growth of the gramineous weeds without deleterious effects on the crop plant.

6. A composition for the control of gramineous weeds which comprises a herbicidal amount of a dialkyl mononitrophenol of the formula

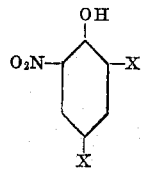

wherein X is selected from the group consisting of tertiarybutyl and tertiaryamyl radicals, in intimate mixture with a herbicide carrier and a surface active dispersing agent.

7. A composition for the control of gramineous weeds which comprises a non-ionic surface active dispersing agent and a herbicidal amount of a dialkyl mono-nitrophenol of the formula

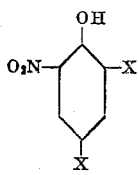

wherein X is selected from the group consisting of tertiarybutyl and tertiaryamyl radicals, in solution in an aromatic hydrocarbon solvent.

8. A composition according to claim 7 wherein the dialkyl mono-nitrophenol is 2,4-ditertiarybutyl-6-nitrophenol.

9. A composition according to claim 7 wherein the dialkyl mono-nitrophenol is 2,4-ditertiaryamyl-6-nitrophenol.

References Cited in the file of this patent

UNITED STATES PATENTS

| | | |
|---|---|---|
| 2,054,509 | Pastac | Sept. 15, 1936 |
| 2,378,716 | Lynn et al. | June 19, 1945 |
| 2,394,916 | Jones | Feb. 12, 1946 |
| 2,630,380 | Hanson et al. | Mar. 3, 1953 |
| 2,747,983 | Mussell | May 29, 1956 |
| 2,796,446 | Dickerson et al. | June 18, 1957 |